United States Patent [19]

Gonzalez

[11] Patent Number: 5,469,830
[45] Date of Patent: Nov. 28, 1995

[54] FUEL BLENDING SYSTEM METHOD AND APPARATUS

[75] Inventor: Cesar Gonzalez, Wichita, Kans.

[73] Assignee: The Cessna Aircraft Company, Wichita, Kans.

[21] Appl. No.: 394,415

[22] Filed: Feb. 24, 1995

[51] Int. Cl.$^6$ .................................................. F02M 37/04
[52] U.S. Cl. ............................................ 123/515; 123/575
[58] Field of Search ............................. 123/515, 575, 123/576, 577, 578; 73/35; 44/2

[56] References Cited

U.S. PATENT DOCUMENTS

| | | | |
|---|---|---|---|
| 2,940,435 | 6/1960 | Nemec | 123/575 |
| 2,958,317 | 11/1960 | McNally | 123/515 |
| 3,469,954 | 9/1969 | Hoffman | 123/575 |
| 3,864,095 | 2/1975 | Sinclair | 44/2 |
| 4,321,905 | 3/1982 | Kurasawa | 123/575 |
| 4,422,413 | 12/1983 | Pederson | 123/25 R |
| 4,854,286 | 8/1986 | Chemnitzer | 123/575 |
| 5,044,344 | 9/1991 | Tuckey | 123/497 |
| 5,092,305 | 3/1992 | King | 123/575 |
| 5,233,944 | 8/1993 | Mochizuchi | 123/575 |

FOREIGN PATENT DOCUMENTS

| | | | |
|---|---|---|---|
| 0133777 | 3/1985 | European Pat. Off. | 123/515 |
| 0214665 | 12/1983 | Japan | 123/515 |
| 2058211 | 4/1981 | United Kingdom | 123/515 |

*Primary Examiner*—Carl S. Miller
*Attorney, Agent, or Firm*—Edward L. Brown, Jr.

[57] ABSTRACT

The system is an on-board and in-line system for blending two fuels of known characteristics to achieve instantaneous in-line change in the octane rating of fuel flowing to the engine. The blending system provides a means of precise in-line blending of two reference fuels in an on-board aircraft or land vehicle installation. Based on appropriate calibration blending curves, the system will provide instantaneous indications of both lean and rich performance ratings of the fuel. Instantaneous lean and rich performance ratings of the blended fuel streams may be recorded concurrently with engine parameters and ambient test data, and with combustion knock severity numbers derived from the previously mentioned detonation indication system.

9 Claims, 1 Drawing Sheet

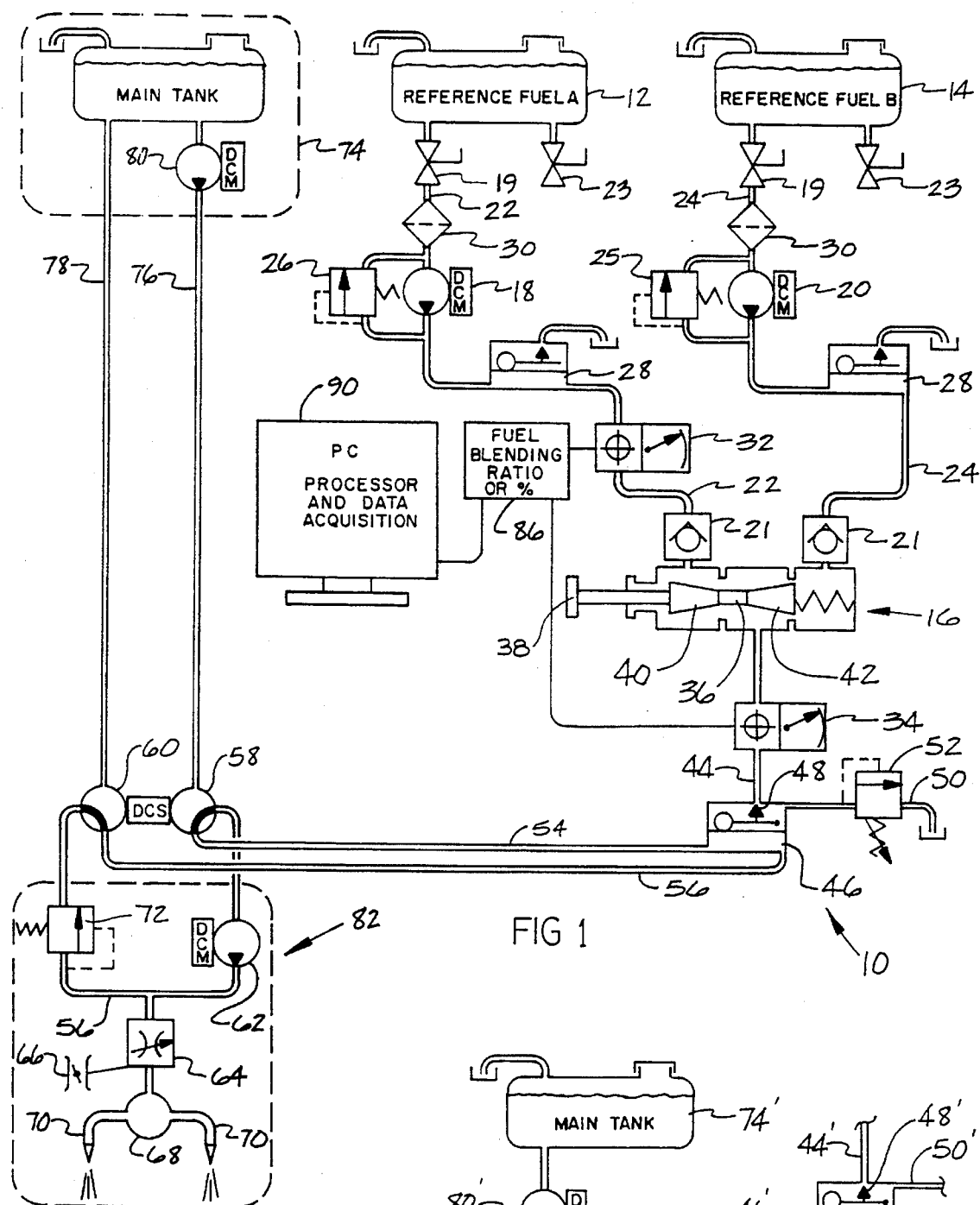
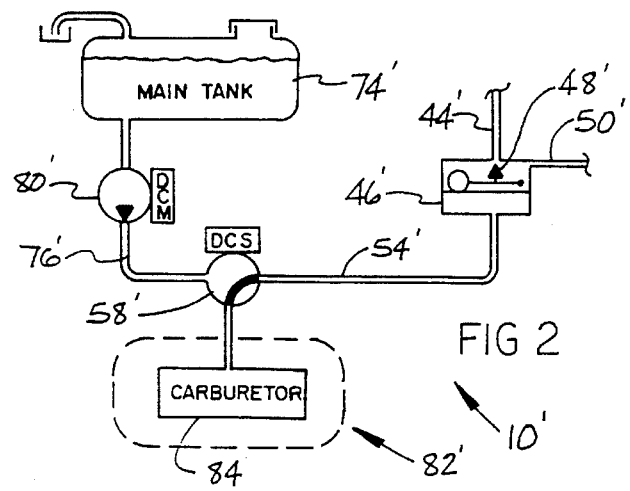
FIG 1
FIG 2

FUEL BLENDING SYSTEM METHOD AND APPARATUS

BACKGROUND OF THE INVENTION

Mixing of gasolines and additives to achieve various octanes ratings for different spark ignition engines has been taking place for decades. Determinations of performance or octane ratings of fuels are normally carried out on the basis of comparative tests against certified reference fuels of known and controlled characteristics. Conversely, the determination of octane requirements of engines and vehicles, are again carried out by repetitive testing with a range of reference test fuels of known characteristics.

These reference tests fuels are normally pre-mixed in precise ratios to yield specific performance or octane ratings in accordance with blend ratio tables issued by the test fuel producers.

Blended fuels are then stored and introduced to the laboratory engine or vehicle in separate containers. While these widely adopted practices do not compromise the performance of these tests in laboratories or ground vehicle settings, the storage of a wide range of test fuels in a test aircraft raises serious installation and safety issues.

To perform fuel evaluations and octane determination tests on ground and aircraft in-flight settings in a safe and expeditious manner, the test fuels blender system of the present invention has been developed.

The system is an on-board and in-line system for blending two fuels of known characteristics to achieve instantaneous in-line change in the octane rating of fuel flowing to the engine. The fuel blending system may be used in conjunction with a detonation indication system set forth in applicant's pending application, Serial No. 346,822, titled Aircraft Engine Detonation Indication System: The blending system of the present invention is utilized in determining the octane sensitivity factors of unleaded fuels and engine octane requirements. The blending system provides a means of precise in-line blending of two reference fuels in an on-board aircraft or land vehicle installation. Based on appropriate calibration blending curves, the system will provide instantaneous indications of both lean and rich performance ratings of the fuel. Instantaneous lean and rich performance ratings of the blended fuel stream may be recorded concurrently with engine parameters and ambient test data, and with combustion knock severity numbers derived from the previously mentioned detonation indication system.

PRIOR ART

An example of an in-line blending system is found in U.S. Patent No. 3,864,095 which is a system utilized in a refinery during the production of gasolines, which adds the various anti-knock lead alkyl compounds during in-line gasoline blending. The amount of anti-knock additive is kept at a constant flow rate while the gasoline stream is modulated to adjust the overall octane rating of the gasoline. This system is also different from the present invention, in that it utilizes an octane analyzer which is sensing the on-going stream rather than use of two reference fuels of known octane characteristics which are volumetrically blended to achieve a known octane rating. Another blending system is illustrated in U.S. Pat. No. 4,422,413 which is an on-board system for trucks. The system adds fuel additives to the regular diesel tanks of a truck in specified amounts. To achieve proper dosage in this blending system, a timer is used which operates a constant flow pump whereby the precise amount of additive can be measured. The system is not a true "in-line" system.

It is the primary object of the present invention to provide a blending system for aircraft or other piston engines which utilize two reference fuels of known octane characteristics to achieve an in-line instantaneous known change of the octane rating of the fuel flowing to the engine.

Another object of the present invention is to provide a blending system of two known fuels to achieve a specific octane rating of the fuel flowing to the engine which is unaffected by engine power and mixture settings.

A further object of the present invention is to provide a fuel blending system which instantaneously varies the octane rating of the blended stream while the aircraft or other vehicle is being operated under varying conditions to measure the combustion knock severity of various octane levels.

Another object of the present invention is to provide an on-board adjustable octane blending system which provides a fuel stream with a precise octane number.

Other objects and advantages of the invention will become apparent to those skilled in the art from a study of the detailed description of the preferred embodiments, as set forth herein and illustrated in the accompanying drawing.

BRIEF DESCRIPTION OF THE DRAWINGS

FIG. 1 is a schematic illustration of an in-line, on-board blending system for a fuel injected piston aircraft engine featuring excess or return fuel provisions; and FIG. 2 is a schematic illustration of the same blending system on a carburetor piston engine with portions of the blending system not shown.

DESCRIPTION OF THE PREFERRED EMBODIMENT

The on-board fuel blending system of the present invention is shown in FIG. 1 and is generally described by reference numeral 10. The term "on-board" means that the system is carried in the aircraft or other vehicle and is connected to the engine and the existing fuel system in the airplane or vehicle. The term "in-line" means that the blended fuel flows directly to the engine rather than to a separate blended tank. The system 10 basically combines two reference fuels of known octane A and B in a blending valve 16 to achieve a blended fuel of a precisely known octane rating for use in various test conditions in conjunction with the above-mentioned detonation system.

The two reference fuels A and B are stored externally from the blender system in tanks 12 and 14 respectively. These tanks include conventional fill openings and are separately vented to atmosphere to avoid cross-contamination. The tanks 12 and 14 also include a manual drain/dump valve 23 to discharge the fuels overboard in the event of an in-flight emergency, or during routine draining operations. The high octane reference fuel A flows to blending valve 16 via line 22 and pump 18 which maintains a constant discharge pressure regardless of the flow rate. Pressure regulator 26 maintains the pump discharge pressure constant regardless of rate of flow from the pump. Also provided in line 22 is a manual shut-off valve 19, filter 30, a vapor separator 28 and a flow meter 32, all of which are conventional components used in fuel systems. The pumping action of the electrically driven pump 18 creates gasoline vapors in its discharge and the separator 28 is provided to vent those vapors out of the system to atmosphere prior to passing through flow meter 32 and blending valve 16. Also provided in line 22 is a check valve 21 which prevents back flow in the line in the event of pressure gradient reversals.

Reference fuel B, which is a lower octane reference fuel, is stored in the tank 14 and flows through line 24 to the blending valve 16. The pump 20 in line 24 is similar to pump 18 and includes a pressure regulator 25, set at the same relieving pressure level as pressure regulator 26. Line 24 also includes shut-off valve 19, filter 30, vapor separator 28 and a check valve 21, all of which function in the same manner as those in line 22.

Blending valve 16 includes a valve spool 36 which has cone-shaped orificing surfaces 40 and 42 on the left and right hand ends. Axially connected to spool 36 is a knob 38 which is threaded into the valve body so rotation of knob 38 creates gradual linear movement of valve spool 36. Spool 36, in its full leftward position as seen in FIG. 1 blocks all the flow in line 24 while the orifice surface 40 in line 22 is full open. The discharge from blending valve 16 flows from the exit port in the center of the valve through exit line 44. Line 44 which carries the blended amounts of fuels A and B also includes a flow meter 34 which measures the total flow of the blended fuel being consumed by the engine. Located immediately downstream in exit line 44 is a fuel level controller 46. Positioned in the controller 46 is a float actuated needle valve 48 which blocks all flow in the exit line 44 if the fuel exceeds a certain level. Connected to controller 46 is an engine supply line 54 and a return line 56. Positioned downstream in both lines 54 and 56 and externally to the blender system, are three-way interconnected valves 58 and 60, both of which may be manually or solenoid actuated.

When the aircraft is being operated on the blended fuels, the three-way valves 58 and 60 are in the positions indicated in FIG. 1. When the aircraft engine is not utilizing blended fuels, the valves 58 and 60 are positioned to block any flow from the blending system 10 while connecting the engine to the aircraft main fuel tank 74. Tank 74, contained in dotted lines, may include an electrically driven boost pump 80 positioned proximate the tank which provides low pressure to the engine in supply line 76 which is returned in line 78 across pressure regulator 72.

The engine compartment 82, contained in dotted lines, symbolically sets forth the fuel delivery and return lines of a conventional fuel injected system. This system includes an engine driven pump 62 supplied with low pressure blended fuel in line 54. Pump 62 in turn supplies metering valve 64, which is essentially a variable orifice mechanically linked to the manually controlled throttle, not shown. Downstream of metering valve 64 is a manifold valve 68 which in turn supplies individual injector nozzles 70. Metering valve 64 is mechanically tied to air throttle 66 which proportionally increases the intake air to the engine as the flow rate through metering valve 64 increases. The capacity of pump 62 always exceeds the engine's maximum flow; therefore there is return flow in line 56 across a pressure regulator 72. The return flow in line 56 enters fuel level controller 48 and the float actuated needle valve 48 will modulate the flow entering controller 46 from blending valve 16 so that the flow rate entering fuel level controller 46 will be the actual consumption rate of the engine. Also connected to controller 46 is a vent line 50 which includes a pressure regulator 52 for maintaining a back pressure of approximately 0.5 to 2.0 psi in supply line 54.

FIG. 2 illustrates a carburetor fuel system on an aircraft engine connected to the blending system 10' of the present invention with portions of the blending system not shown. The engine compartment 82' includes a carburetor 84 shown in block form supplied by blended fuel from fuel level controller 46' through the supply line 54'. With a carburetor there is no return flow and therefore only a single three-way valve 58' connects the engine to either the blending system 10', or to the conventional aircraft main tank 74' A conventional tank 74' may also include a boost pump 80' which can supply the engine through supply line 76'.

OPERATION

The blending system 10 of the present invention can be utilized to power the engine of the aircraft or alternately the aircraft's main fuel tank 74 can be used. If, for example, the blended fuel tests were to be taken at altitude, the aircraft would utilize its conventional fuel tank 74 until the airplane reached the altitude of the planned test. To disconnect the blending system 10 from the engine, the solenoid or manually operated three-way valves 58 and 60, as seen in FIG. 1, would be rotated clockwise 90 degrees so as to isolate the blending system 10 and connect the engine with fuel tank 74.

Once the aircraft is ready to commence its blended fuel tests, valves 58 and 60 are actuated to their FIG. 1 position, opening the fuel blending system to the engine. Flow meter 32 signals a processor 86 of the volume flow of reference fuel A. Flow meter 34 also signals processor 86 of the total amount of combined blended fuel from tanks 12 and 14. With this information the processor 86 can compute the ratio between fuel A and B or the percentage of either fuel A or B. Since the octane levels of the referenced fuels A and B are known and the volumes which are blended are known, the P.C. Processor 90 can compute the instantaneous octane rating of the blended fuel as well as the fuel to air ratio if engine air flow meter provisions are installed, and other engine operational parameters as well.

The knob 38 is adjusted to set the octane level of the blended fuel stream at a predetermined octane to begin the test. With the detonation system, above-mentioned, activated, the operator in a typical test begins to reduce the octane level of the blended fuel by set increments, such as 0.1 octane point. The detonation system which is indicating and recording the occurrence and frequency of detonation along with other data, records along with that data the precise octane level the engine is burning at that moment.

While blending valve 16 is shown as manually operated, it could include a motorized actuator to adjust the octane rating as required to develop incipient detonation conditions during octane requirement rating tests. The blending system in FIG. 1 is a fuel injection system with return fuel from the engine compartment 82 flowing in line 56 to fuel level controller 46. Controller 46 includes a float actuated needle valve 48 which modulates the needle valve so that flow entering controller 46 is the actual engine fuel burn rate. Whenever the octane rating is adjusted at knob 38, the time for purging the previous octane rating fuel from the controller 46 and its connecting lines 54 and 56 is approximately 60 seconds. This very short purging time is due to the very small volume of fuel which is contained in line 54, 56 and controller 46.

In a carbureted engine, such as shown in FIG. 2, the purge time would also be of a very short duration comparable to the injection system in FIG. 1.

It will be understood that the above-described embodiments of the invention are for the purpose of illustration only. Additional embodiments of modifications can be anticipated by those skilled in the art based on a reading and study of the present disclosure. Such additional embodiments and modifications may be fairly presumed to be within the spirit and scope of the invention as defined by the following claims.

I claim:

1. An on-board fuel blending system of two reference fuels A and B of known octane ratings for a piston engine comprising:

first and second fuel tanks with discharge lines each containing respective test fuels A and B;

a constant pressure pump having a discharge line connected to the discharge line of each tank for supplying a constant pressure of both fuel A and fuel B;

an adjustable blending valve with two entry ports and one exit port, each entry port connected to the discharge line of the respective pumps of fuels A and B, the blending valve includes a spool means which as it moves, increases the portion of one reference fuel as it decreases the portion of the other fuel to vary the octane rating of the blended-flow from the exit port;

a first flow meter in the flow path of one of the constant pressure pumps;

a second flow meter in the flow path of the blended flow flowing from the blending valve;

a float controlled needle valve positioned in the mixed fuel flow path which limits the mixed fuel flow to that which the engine is burning; and integral processing means which senses the flow from both said flow meters to compute the percent of each test fuel A and B in the blend and the octane rating of the blended stream.

2. An on-board fuel blending system as set forth in claim 1, wherein the discharge line of each constant pressure pump includes a vapor separator upstream of the first flow meter and the blending valve.

3. An on-board fuel blending system as set forth in claim 1, wherein the discharge line of each constant pressure pump includes a vapor separator upstream of the first flow meter and the blending valve, and a vent line connected downstream of said float controlled needle valve including therein a low pressure regulating means to provide back pressure to the blended fuel flowing to the engine.

4. An on-board fuel blending system as set forth in claim 1, wherein the discharge line of each constant pressure pump includes a vapor separator upstream of the first flow meter and the blending valve, and low pressure regulating means downstream of the float control needle valve to provide back pressure to the blended fuel flowing to the engine.

5. An on-board fuel blending system as set forth in claim 1, wherein the blending valve has manual operating knob for shifting the spool means to adjust the octane rating of the blended fuel flowing therefrom.

6. An on-board fuel blending system as set forth in claim 1, which is used on a fuel injection system having a return flow from the injector system and includes a return line connected to the float chamber of said float control needle valve, the level of which controls the operation of the valve and determines the overall flow rate passing through the blending valve.

7. An on-board fuel blending system as set forth in claim 1, including a three-way valve positioned in the blended-fuel flow path downstream of the float controlled valve having a second position which blocks the blended fuel flow to the engine and opens the engine to the fuel in the main tanks of the, aircraft.

8. A method of achieving instantaneous known octane rating changes in the on-line fuel flow to a piston engine comprising the steps of:

supplying to an adjustable ratio blending valve a constant pressure supply of two reference fuels of known octane characteristics;

measuring the flow rate of one of the two known octane reference fuels, to the blending valve;

measuring the total blended flow rate from the blending valve of the combined fuels;

adjusting the flow rate of the total blended fuels from the blending value to correspond with the actual burn rate of the engine; and sensing the two flow rates, computing the octane rating of the on-line blend flowing to the engine.

9. An on-board fuel blending system, as set forth in claim 1, wherein the computer means also senses and records detonation data along with other engine operating parameters in conjunction with the specific octane levels of the blended mixture.

* * * * *